United States Patent
Koch et al.

(10) Patent No.: US 6,868,717 B2
(45) Date of Patent: Mar. 22, 2005

(54) METHOD AND DEVICE TO ENCAPSULATE TIRE TAG

(75) Inventors: Russell W. Koch, Hartville, OH (US); Walter Tomaszewski, Canton, OH (US); David A. Weitzenhof, Akron, OH (US); Paul B. Wilson, Tallmadge, OH (US)

(73) Assignee: Bridgestone/Firestone North America Tire, LLC, Nashville, TN (US)

( * ) Notice: Subject to any disclaimer, the term of this patent is extended or adjusted under 35 U.S.C. 154(b) by 0 days.

(21) Appl. No.: 10/364,176

(22) Filed: Feb. 11, 2003

(65) Prior Publication Data

US 2004/0050170 A1 Mar. 18, 2004

Related U.S. Application Data

(60) Continuation-in-part of application No. 09/943,915, filed on Aug. 31, 2001, now Pat. No. 6,516,673, which is a division of application No. 09/680,639, filed on Oct. 6, 2000, now Pat. No. 6,386,254, which is a division of application No. 09/174,438, filed on Oct. 16, 1998, now Pat. No. 6,161,430.

(51) Int. Cl.[7] .......................... G01M 17/02; B60C 19/08
(52) U.S. Cl. ......................... 73/146; 152/216
(58) Field of Search .................... 73/756, 700, 146, 73/146.5

(56) References Cited

U.S. PATENT DOCUMENTS

| | | | |
|---|---|---|---|
| 5,531,121 A | * 7/1996 | Sparks et al. ................. | 73/716 |
| 6,030,478 A | 2/2000 | Koch et al. | |
| 6,161,430 A | * 12/2000 | Koch et al. .................... | 73/146 |
| 6,255,940 B1 | 7/2001 | Phelan et al. | |
| 6,386,254 B1 | * 5/2002 | Koch et al. ................... | 152/216 |
| 6,516,673 B2 | * 2/2003 | Weitzenhof et al. .......... | 73/756 |
| 2002/0029628 A1 | * 3/2002 | Koch et al. .................... | 73/147 |
| 2002/0124934 A1 | * 9/2002 | Koch et al. .................... | 156/97 |

FOREIGN PATENT DOCUMENTS

| EP | 993 969 A2 | 4/2000 |
|---|---|---|
| EP | 0 993 969 | 4/2000 |

OTHER PUBLICATIONS

European Search Report, Jul. 20, 2004.

* cited by examiner

*Primary Examiner*—Edward Lefkowitz
*Assistant Examiner*—Andre Allen
(74) *Attorney, Agent, or Firm*—Fred H. Zollinger, III; Michael R. Huber

(57) ABSTRACT

A method for encapsulating a monitoring device for a pneumatic tire, wherein the monitoring device includes a threaded rod and a pressure sensor, includes the steps of positioning the monitoring device in an encapsulation chamber of an encapsulation device with a portion of the threaded rod extending from the encapsulation chamber; engaging the threaded rod against the encapsulation device to suspend the electronic monitoring device within the encapsulation chamber; and filling the encapsulation chamber with encapsulation material to encapsulate the monitoring device to form an encapsulated monitoring device. The encapsulated monitoring device may be mounted to a pneumatic tire with an attachment patch.

39 Claims, 15 Drawing Sheets

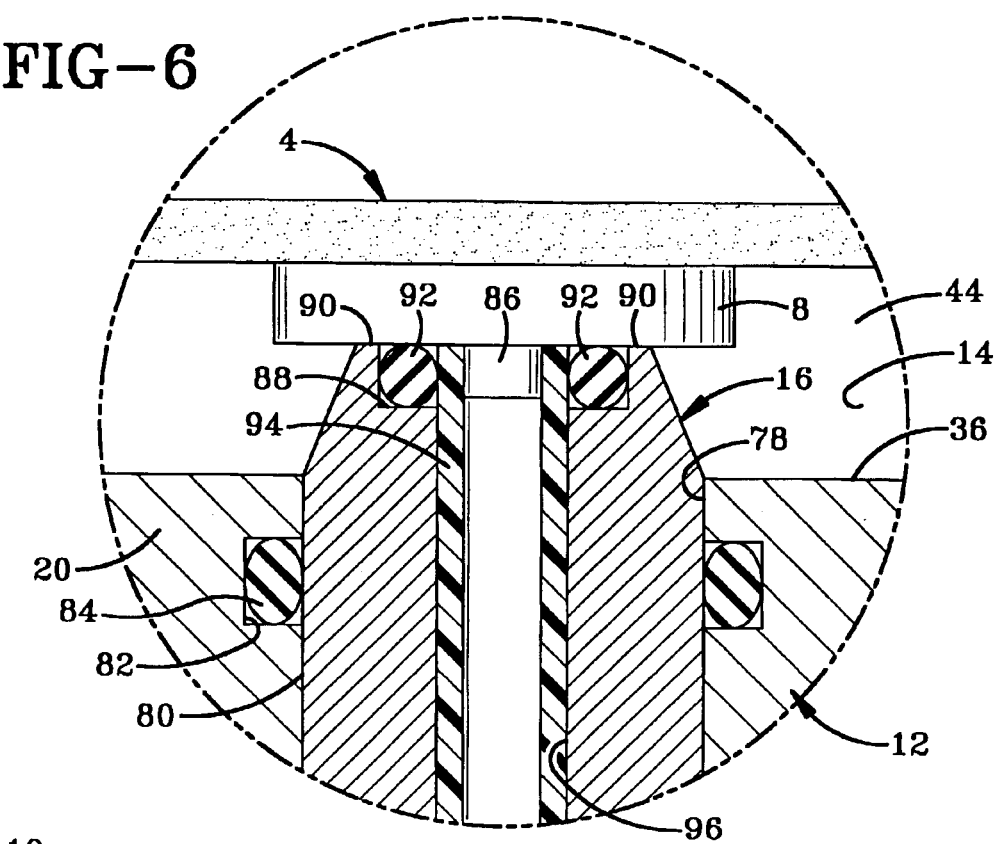
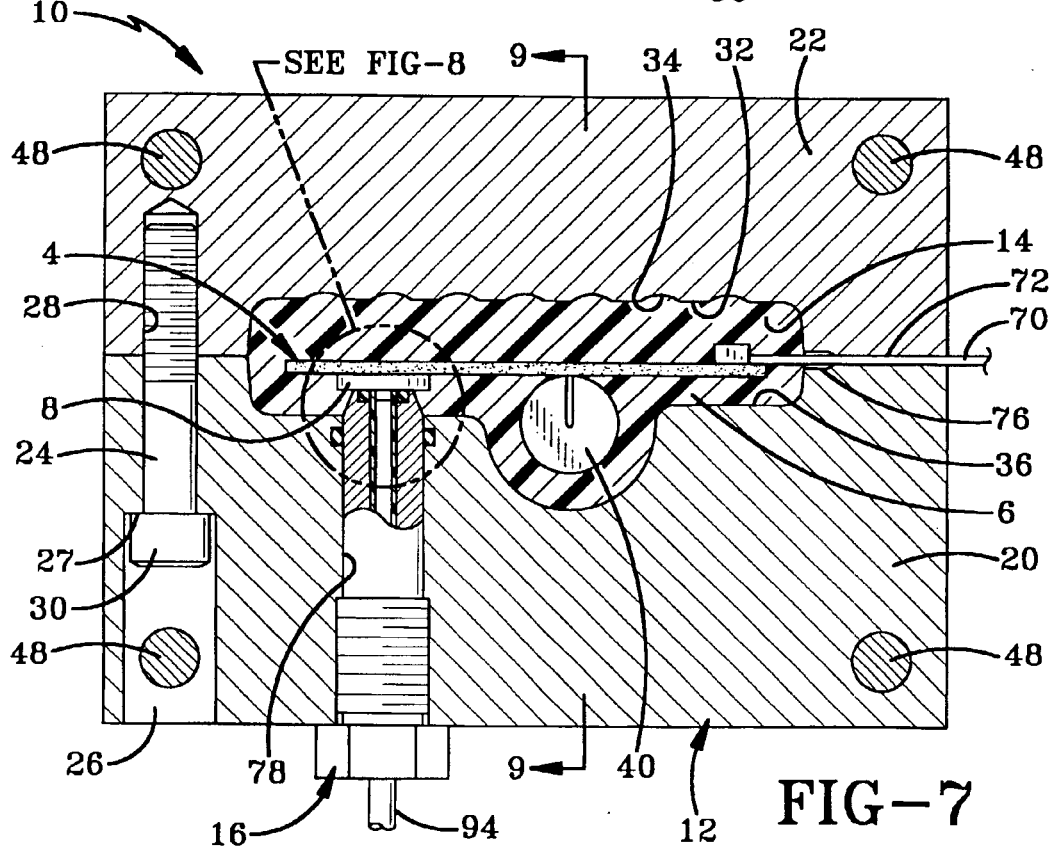

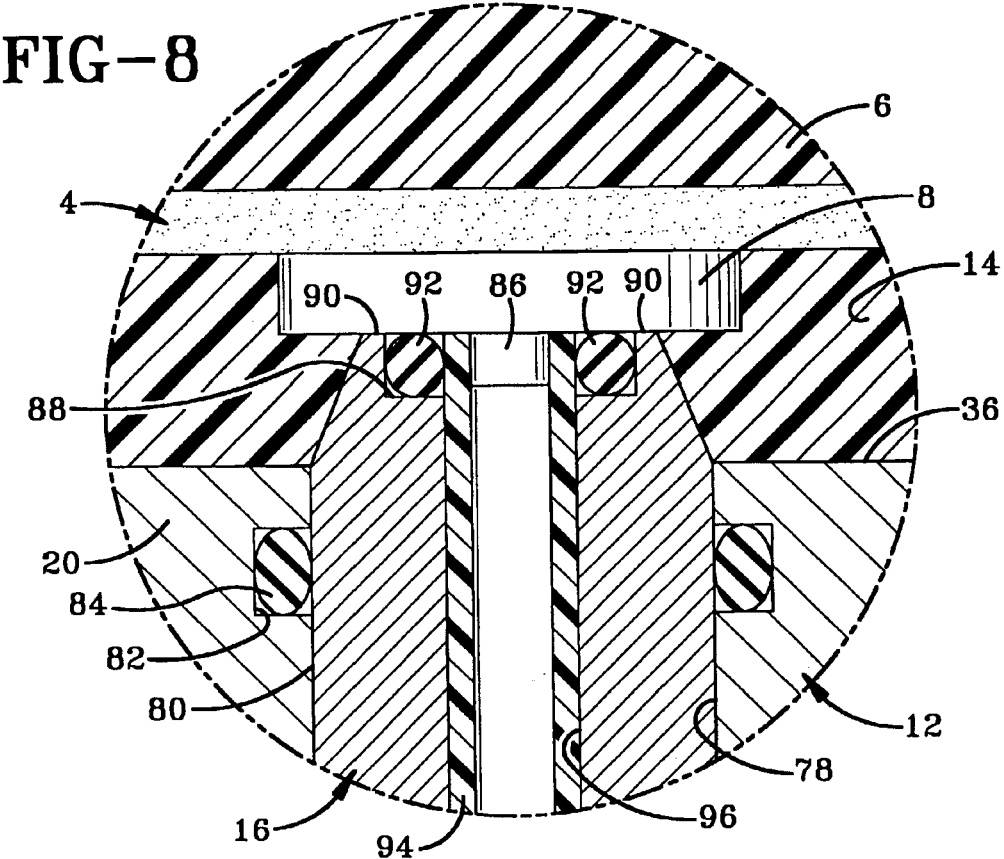
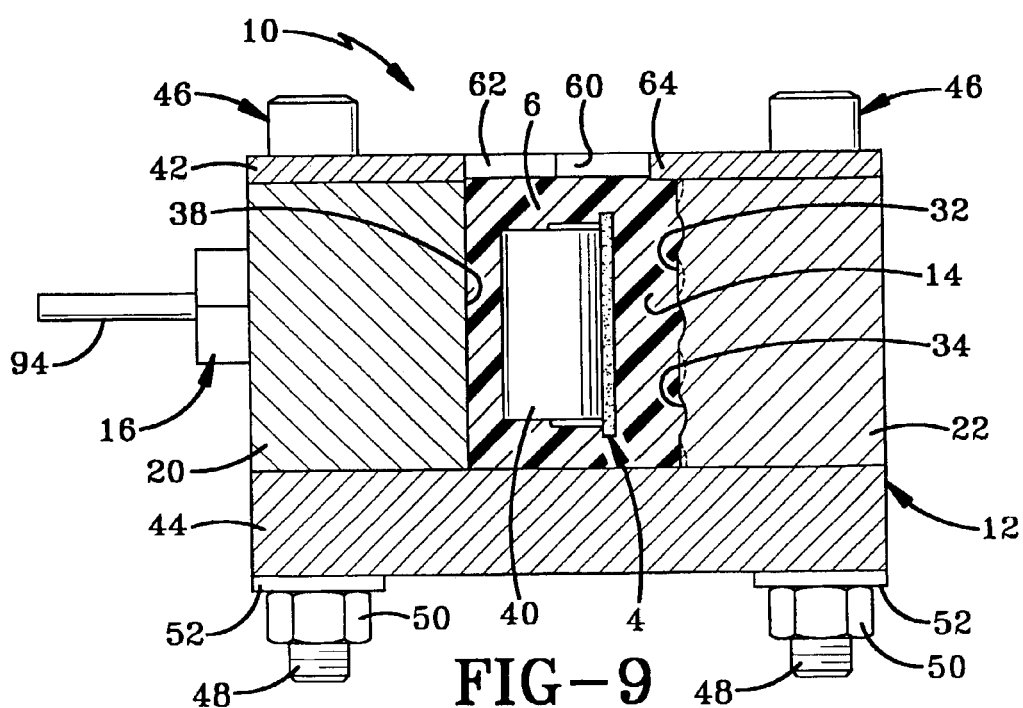

METHOD AND DEVICE TO ENCAPSULATE TIRE TAG

CROSS REFERENCE TO RELATED APPLICATIONS

This application is a continuation-in-part application of U.S. patent Ser. No. 09/943,915 filed Aug. 31, 2001 now U.S. Pat. No. 6,516,673, which is a division of U.S. patent Ser. No. 09/680,639, filed Oct. 6, 2000 now U.S. Pat. No. 6,386,254, which is a division of U.S. patent Ser. No. 09/174,438, filed Oct. 16, 1998, now U.S. Pat. No. 6,161,430; the disclosures of each are incorporated herein by reference.

BACKGROUND OF THE INVENTION

1. Technical Field

The present invention generally relates to an encapsulation device and, more particularly, to an encapsulation device that is used to encapsulate a monitoring device or tire tag that is typically used on the inner surface of a pneumatic tire to monitor tire conditions while the tire is mounted on a vehicle. Specifically, the present invention is related to a device for encapsulating an electronic monitoring device in a protective housing while allowing the pressure sensor of the monitoring device to remain in fluid communication with the surrounding atmosphere so that it may function.

2. Background Information

It is often desired in the art to monitor the conditions of a tire while it is installed and in use on a vehicle. Typical desirable measurements are tire wear, internal temperature, and internal pressure. These measurements are preferably taken while the tire is in use on a vehicle without having to remove the tire from the vehicle or specially position the tire to take the measurement. Numerous types of monitoring devices are known in the art to perform these measurements. One type of known monitoring device uses a passive integrated circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active, self-powered programmable electronic devices are disclosed in U.S. Pat. Nos. 5,573,610, 5,562,787, and 5,573,611 which are assigned to the assignee of the present application.

One of the problems in the art with these monitoring devices is that they are relatively fragile when compared to the harsh environment of a pneumatic vehicle tire. The forces experienced by a pneumatic tire are sufficient to break the fragile electronic monitoring device and render it unusable. These forces include rotational forces caused by the rotation of the tire and shock forces caused by the tire impacting articles on the ground. It is thus necessary to provide the monitoring device with some protection from these forces. One manner of protecting the sensitive electronic monitoring device is to encapsulate the device in a relatively rigid material such as a hardened epoxy or plastic. The encapsulating material holds the elements of the electronic monitoring device in position with respect to each other and prevents the electronic monitoring device from tearing apart when subjected to the tire forces.

A problem with encapsulating the monitoring device is that the monitoring device preferably includes a pressure sensor that must remain in fluid communication with the internal cavity of the tire so that the pressure sensor may sense the internal pressure of the tire. The required fluid communication thus dictates that the entire electronic monitoring device cannot be encapsulated and that a breathing hole must be provided either during encapsulation or formed after encapsulation. Forming the breathing hole after encapsulation is generally not desired given the difficulty of precisely locating the hole, cleaning the pressure sensor, and the expense of the additional step in the encapsulation process. It is thus desired in the art to provide an encapsulation device that allows a monitoring device having a pressure sensor to be encapsulated while maintaining fluid communication between the pressure sensor and the surrounding atmosphere.

Another problem encountered with encapsulating an electronic monitoring device is that the monitoring device must be entirely encapsulated in preferably a single step. The monitoring device thus must float within the encapsulation chamber so that the encapsulation material may completely surround the encapsulation device. It is thus desired in the art to provide an encapsulation device that holds the monitoring device in a manner so that it may be entirely encapsulated in a single step. This problem is complicated when the user of the device wishes to mount the device to the tire with a threaded connection. In such a connection configuration, a threaded post must extend from the device in a manner that allows the threaded post to be threaded into a corresponding cavity in an attachment patch that is connected to the tire.

BRIEF SUMMARY OF THE INVENTION

In view of the foregoing, it is an objective of the present invention to provide a method and a device for encapsulating an electronic monitoring device or tire tag that is used in a pneumatic tire.

In one embodiment of the invention, the invention provides a method for encapsulating a monitoring device for a pneumatic tire wherein the monitoring device includes a threaded rod and a pressure sensor. The method includes the steps of: positioning the monitoring device in an encapsulation chamber of an encapsulation device with a portion of the threaded rod extending from the encapsulation chamber; positioning a damming element over the pressure sensor to prevent the pressure sensor from clogging; and filling the encapsulation chamber with encapsulation material to encapsulate the monitoring device to form an encapsulated monitoring device.

Another embodiment of the invention provides a method for encapsulating a monitoring device for a pneumatic tire wherein the monitoring device includes a threaded rod and a pressure sensor. In this embodiment, the method includes the steps of: positioning the monitoring device in an encapsulation chamber of an encapsulation device with a portion of the threaded rod extending from the encapsulation chamber; engaging the threaded rod against the encapsulation device to suspend the electronic monitoring device within the encapsulation chamber; and filling the encapsulation chamber with encapsulation material to encapsulate the monitoring device to form an encapsulated monitoring device.

In a further embodiment, the invention provides the combination of an encapsulation device for encapsulating a monitoring device and a monitoring device. In this embodiment, the combination includes: an encapsulation device defining an encapsulation chamber; a monitoring device having a threaded rod and a pressure sensor; and the monitoring device being suspended in the encapsulation chamber through the engagement of the threaded rod with the encapsulation device.

BRIEF DESCRIPTION OF THE SEVERAL VIEWS OF THE DRAWINGS

FIG. 6 is an enlarged view of the portion encircled by the circle labeled with FIG. 6 in FIG. 5.

FIG. 7 is a view similar to FIG. 5 with the encapsulation chamber filled with an encapsulation material.

FIG. 8 is an enlarged view of the portion encircled by the circle labeled with FIG. 8 in FIG. 7.

FIG. 9 is a section view taken along line 9—9 of FIG. 7.

Similar numbers refer to similar element throughout the specification.

DETAILED DESCRIPTION OF THE INVENTION

Figure 1:
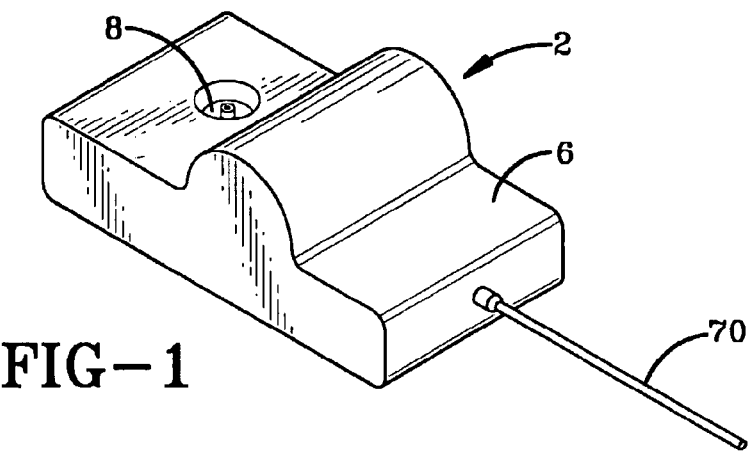
FIG. 1 is a perspective view of an encapsulated monitoring device that was encapsulated in the device of the present invention.
Figure 2:
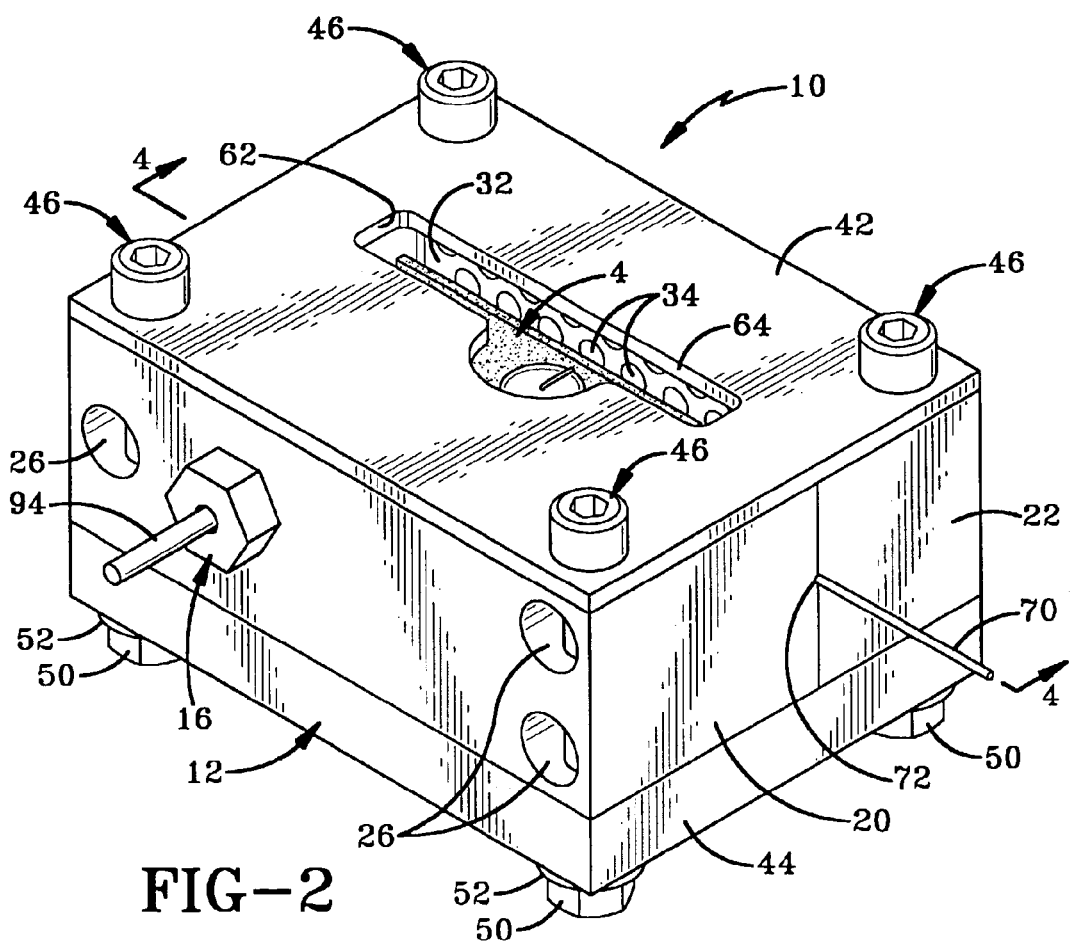
FIG. 2 is a perspective view of the device to encapsulate a substrate containing sensitive electronic components and a pressure sensor pack.
Figure 3:
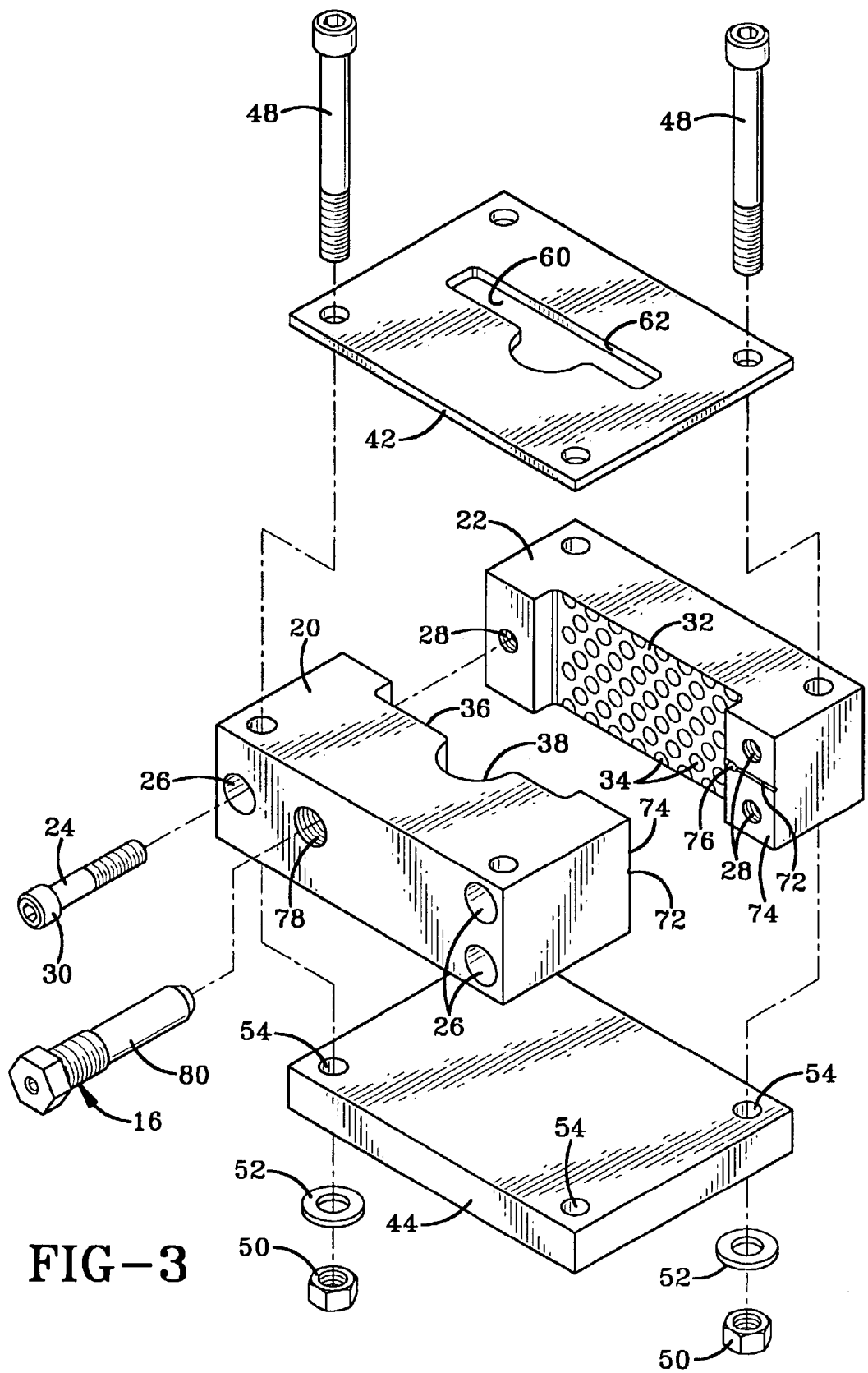
FIG. 3 is an exploded perspective view of the encapsulating device of the present invention shown in FIG. 2.

An encapsulated monitoring device used to monitor pneumatic tires is depicted in FIG. 1 and is indicated generally by the numeral 2. Encapsulated monitoring device 2 includes a monitoring device 4 that has been encapsulated in an encapsulation material 6. Encapsulation material 6 creates a protective housing for monitoring device 4 that prevents monitoring device 4 from breaking when subjected to the forces experienced by a pneumatic tire. Encapsulation material 6 may be an epoxy that is substantially rigid when it cures or a suitable plastic. It is desired in the art for encapsulation material 6 to completely surround monitoring device 4 so that monitoring device 4 is completely protected while in use. A problem occurs with encapsulating the entire monitoring device 4 when monitoring device 4 includes a pressure sensor 8 that must remain in fluid communication with the interior chamber of a pneumatic tire for the pressure sensor to function.

In accordance with one of the objectives of the present invention, a device for encapsulating monitoring device 4 with encapsulation material 6 is depicted in the drawings and is indicated generally by the numeral 10. Encapsulating device 10 is adapted to entirely encapsulate monitoring device 4 while allowing pressure sensor 8 of monitoring device 4 to remain in fluid communication with the atmosphere surrounding encapsulated monitoring device 2. Encapsulating device 10 generally includes an encapsulation body 12 that has an encapsulation chamber 14 disposed in body 12. Encapsulation chamber 14 is configured to receive monitoring device 4 in a floating arrangement such that device 4 is substantially centered in encapsulation chamber 14 when it is received therein. The embodiment of the invention described here and depicted in the drawings is shown for encapsulating a specific embodiment of monitoring device 4 that has an overall rectangular shape with a cylindrical bulge protruding from one side of the rectangle. It is understood that the concepts of the present invention may be adapted to function with monitoring devices having different configurations and shapes than monitoring device 4 depicted in these drawings. Encapsulating device 10 also includes a damming element 16 that is carried by encapsulation body 12 where it contacts monitoring device 4 at pressure sensor 8 to support monitoring device 4 within encapsulation chamber 14 and to prevent pressure sensor 8 from becoming clogged when encapsulation chamber 14 is filled with encapsulation material 6. Encapsulating device 10 is used by placing monitoring device 4 in encapsulation chamber 14 in a floating arrangement that allows encapsulation material 6 to surround most of monitoring device 4. Encapsulation material 6 is then poured into or otherwise introduced into encapsulation chamber 14 to surround monitoring device 4. Encapsulation material 6 is then permitted to cure or dry to form encapsulated monitoring device 2 depicted in FIG. 1.

Encapsulation body 12 includes a first body half 20 and a second body half 22 that cooperate to form encapsulation chamber 14 when halves 20 and 22 are connected. Body halves 20 and 22 may be connected by a plurality of connectors 24 such as the bolts depicted in the drawings. Each connector 24 is received in a hole 26 in first body half 20 and a threaded hole 28 in second body half 22. In the embodiment of the invention depicted in the drawings, three connectors 24 are used to hold body halves 20 and 22 together. In other embodiments of the invention, different numbers of connectors 24 may be used and different types of connectors may hold body halves 20 and 22 together. Each hole 26 includes a shoulder 27 that engages the head 30 of connector 24 to create the clamping force between connector 24 and body halves 20 and 22.

In accordance with one of the objectives of the present invention, second body half 22 includes a textured surface 32 that forms a portion of encapsulation chamber 14 when body halves 20 and 22 are connected. In the embodiment of the invention depicted in the drawings, textured surface 32 includes a plurality of dimples 34 that are concave with respect to encapsulation chamber 14. Each dimple 34 is filled with encapsulation material 6 to form a textured surface on encapsulated monitoring device 2 that improves the ability of encapsulated monitoring device 2 to adhere to surfaces such as the innerliner of a pneumatic tire. Other textured surfaces 32 may also be used instead of dimples 34 that simply provide an exemplary embodiment of the present invention.

First body half 20 includes a chamber wall 36 that defines another portion of encapsulation chamber 14 when halves 20 and 22 are connected. Chamber wall 36 includes a battery portion 38 that extends into first body half 20 to accommodate the battery 40 of monitoring device 4.

Although first and second body halves 20 and 22 may be configured to completely form encapsulation chamber 14 when they are connected, the preferred embodiment of the present invention uses a top plate 42 and a bottom plate 44 to complete encapsulation chamber 14 and to hold body halves 20 and 22 together. Body halves 20 and 22 are sandwiched between top plate 42 and bottom plate 44. A plurality of connectors 46 connect elements 42, 20, 22, and 44 in a manner that is known in the art. For instance, each connector 46 may include a bolt 48 that is configured to extend entirely through top plate 42, a body half 20 or 22, and bottom plate 44 where a nut 50 threadably engages the threaded end of bolt 48. A washer 52 may further be used between nut 50 and bottom plate 44. In other embodiments of the present invention, the bore 54 and bottom plate 44 may be threaded to threadably receive bolt 48.

In accordance with another objective of the present invention, top plate 42 has an opening 60 that substantially matches the contours of encapsulation chamber 14. Opening 60 forms an edge 62 in top plate 42. As best seen in FIG. 9, edge 62 is substantially flush with encapsulation wall 36 and battery portion 38 while extending over a portion of encapsulation chamber 14 to form a lip 64. Lip 64 serves an indicator that tells a person filling encapsulation chamber 14 with encapsulation material 6 that encapsulation chamber 14 is completely filled. The person filling encapsulation chamber 14 thus stops adding encapsulation material 6 to encapsulation chamber 14 when material 6 reaches lip 64. In automated applications, a sensor may be disposed at lip 64 to indicate when encapsulation chamber 14 has been filled. In the exemplary embodiment of the present invention, lip 64 extends only along one side of encapsulation chamber 14. It is also contemplated that lip 64 may extend entirely about encapsulation chamber 14 or merely over another small portion of encapsulation chamber 14 different from the bottom edge depicted in the drawings.

In accordance with another objective of the present invention, body halves 20 and 22 cooperate to hold monitoring device 4 in a floating disposition within encapsulation chamber 14. The floating disposition allows monitoring device 4 to be entirely surrounded by encapsulation material 6. One of the manners of supporting monitoring device 4 in this floating disposition is to support the antenna 70 of monitoring device 4 in a channel 72 disposed in body 12. In the preferred embodiment of the present invention, channel 72 is formed in one or both of mating surfaces 74 of body halves 20 and 22 so that monitoring device 4 may be placed in encapsulation chamber 14 as body halves 20 and 22 are being put together to clamp antenna 70 between body halves 20 and 22. In the preferred embodiment, channel 72 is partially formed in each body half 20 and 22. Channel 72 includes a wide area 76 adjacent encapsulation chamber 14 that allows encapsulation material 6 to surround a portion of antenna 70 to provide strength to antenna 70 to help prevent it from breaking off.

Figure 4:
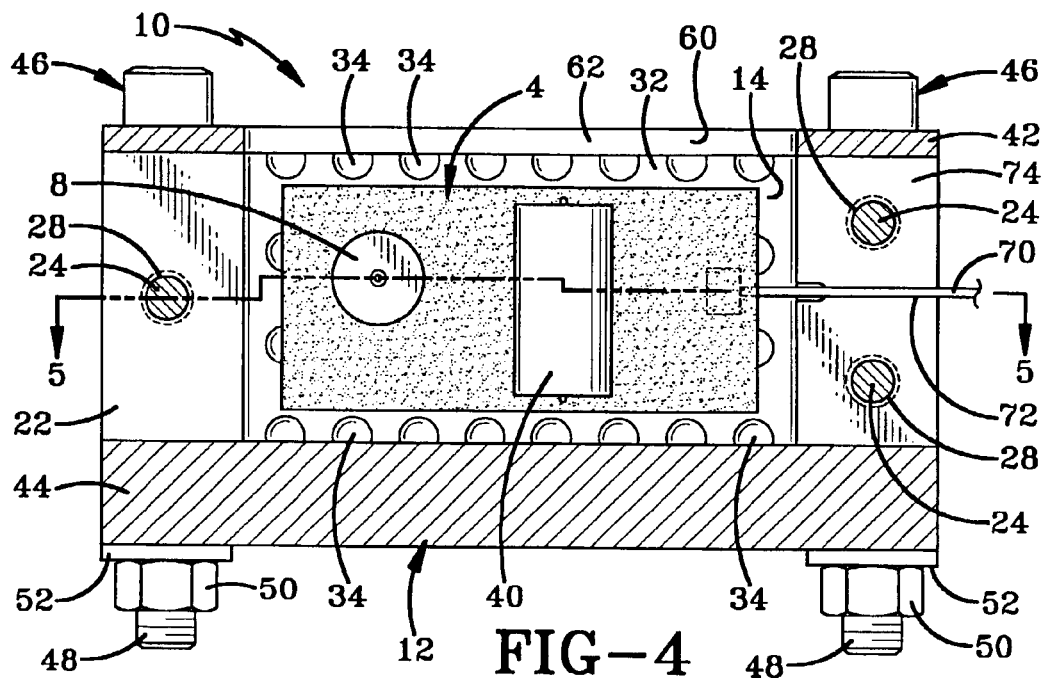
FIG. 4 is a sectional view taken along line 4—4 of FIG. 2.
Figure 5:
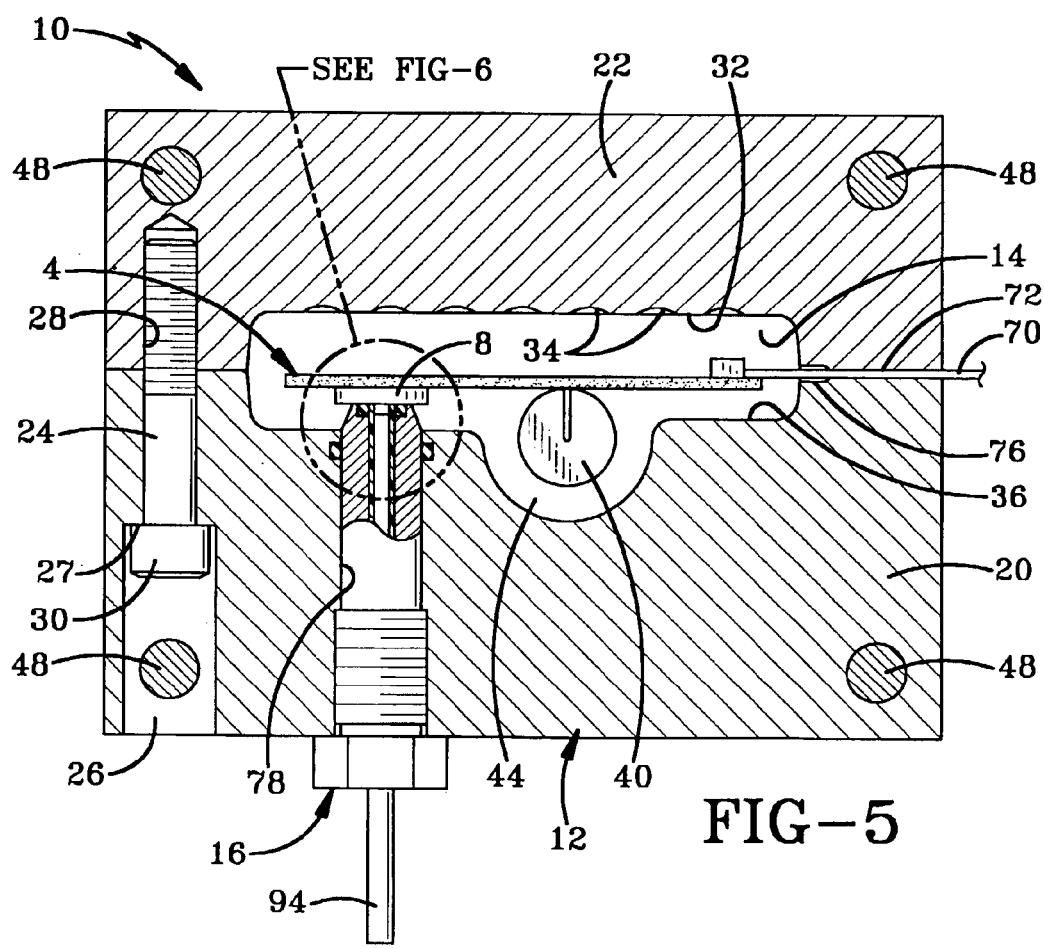
FIG. 5 is a sectional view taken along line 5—5 of FIG. 4.
Figure 10:
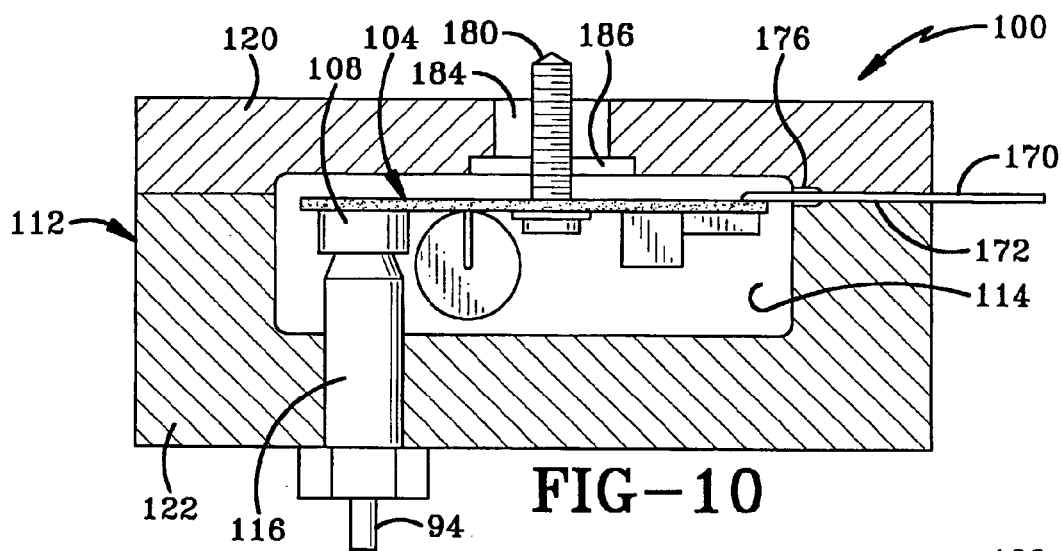
FIG. 10 is a section view similar to FIG. 5 showing a first alternative embodiment of the encapsulation device of the invention.
Figure 11:
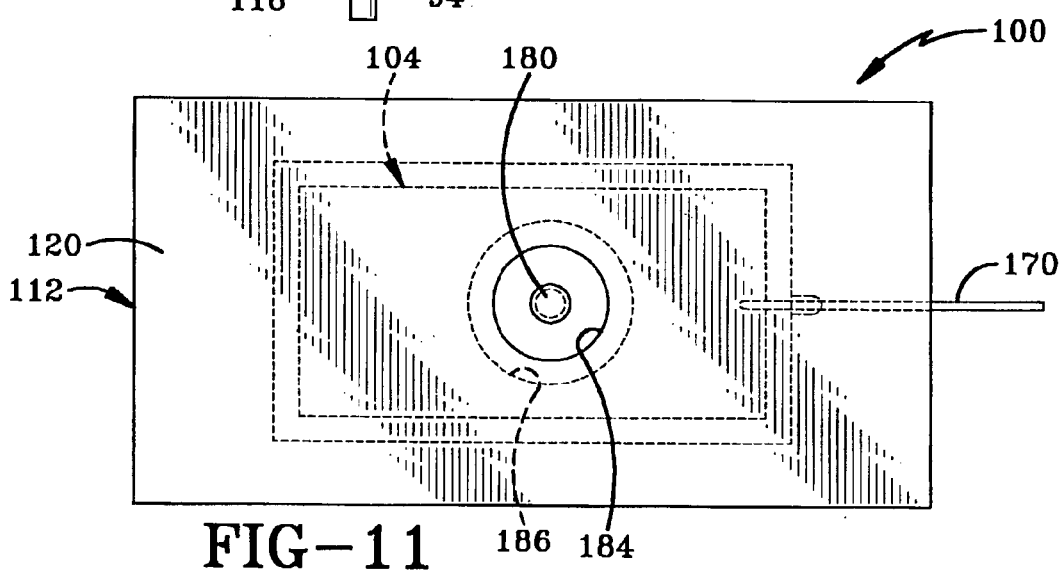
FIG. 11 is a top plan view of the device of FIG. 10.
Figure 12:
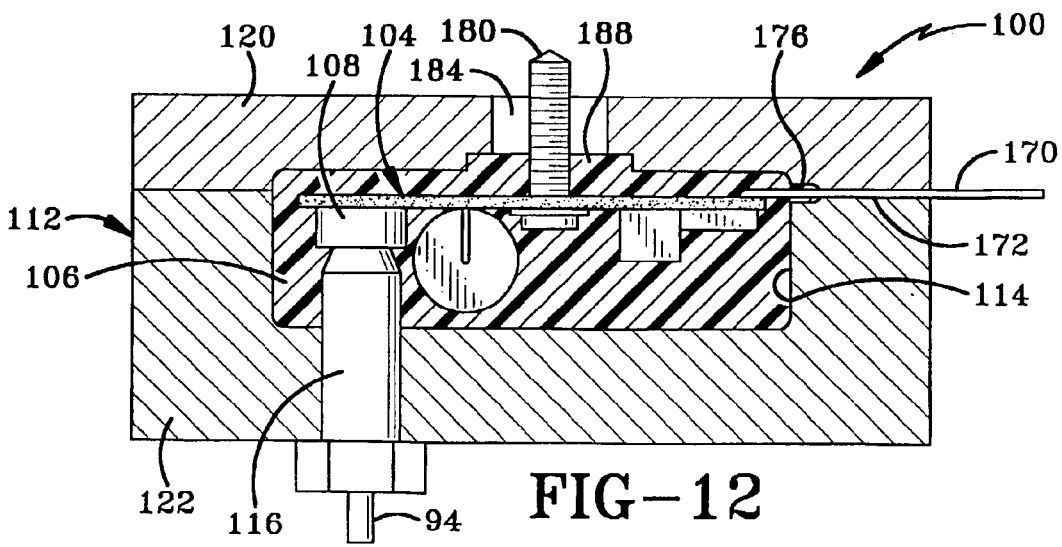
FIG. 12 is a view similar to FIG. 10 with the chamber of the device filled with encapsulation material.
Figure 13:
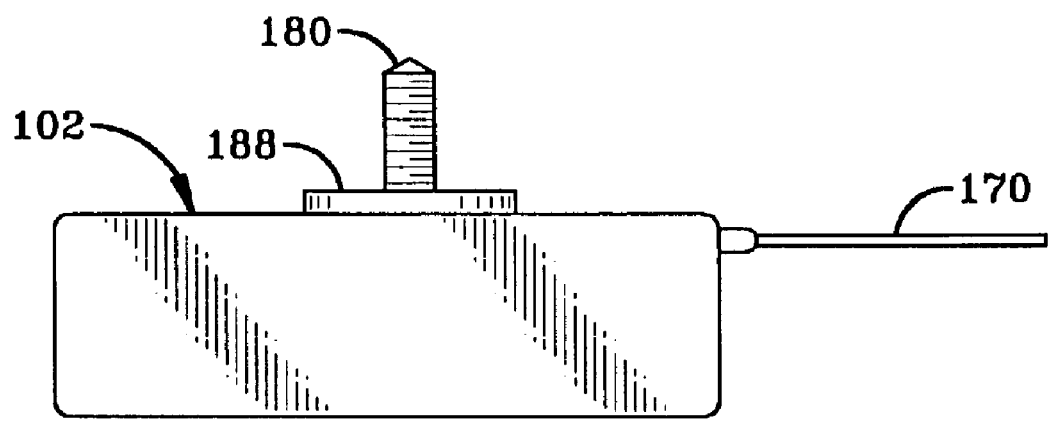
FIG. 13 is a side elevation view of the encapsulated monitoring device made in the first alternative embodiment of the invention.
Figure 17:
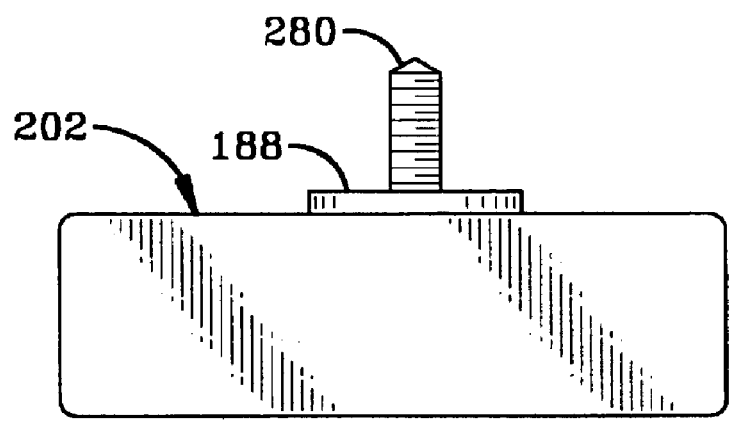
FIG. 17 is a side elevation view of the encapsulated monitoring device made in the second alternative embodiment of the invention.
Figure 14:
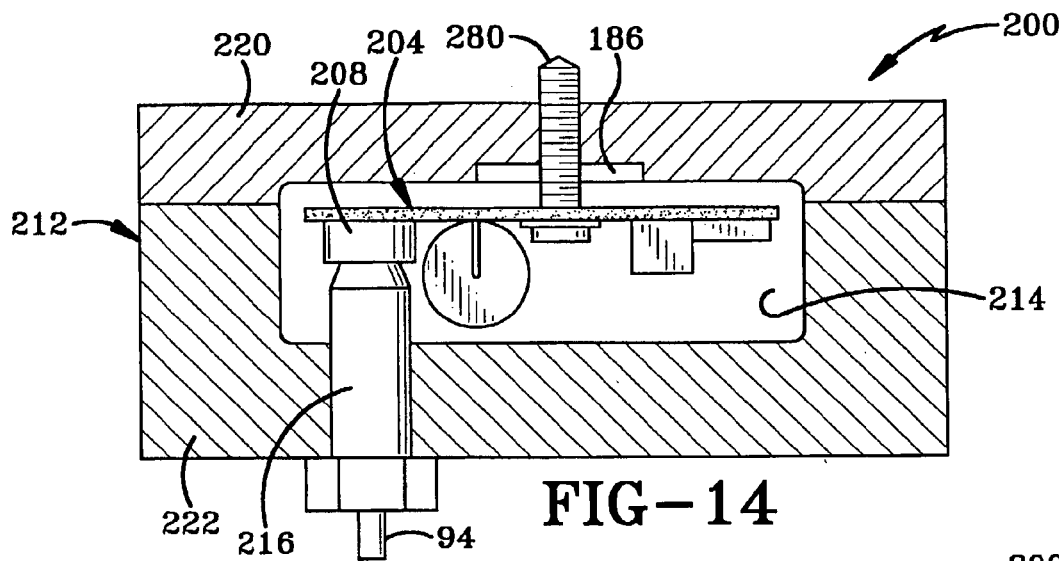
FIG. 14 is a section view similar to FIG. 5 showing a second alternative embodiment of the encapsulation device of the invention.
Figure 15:
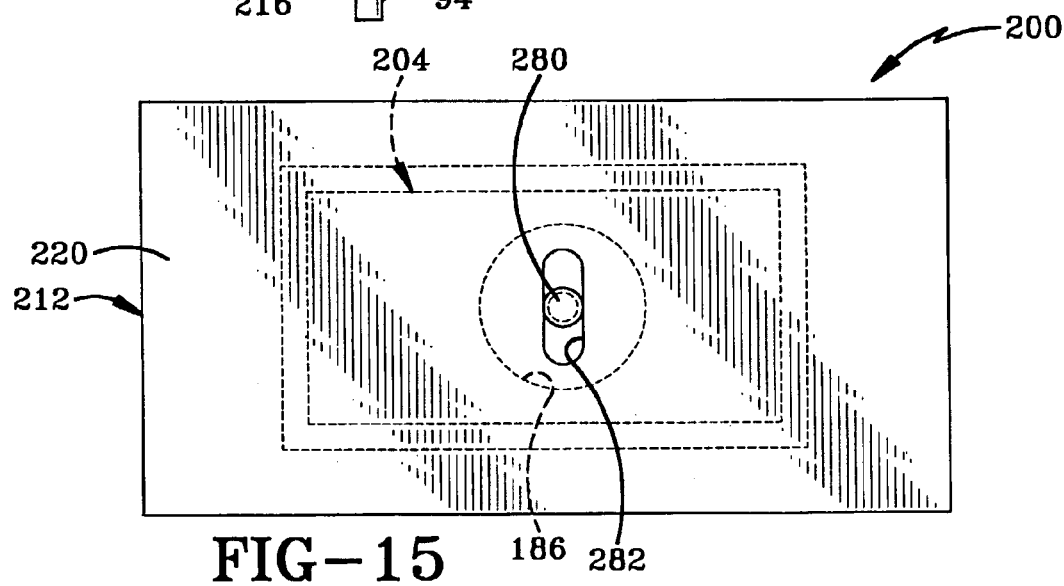
FIG. 15 is a top plan view of the device of FIG. 14.
Figure 16:
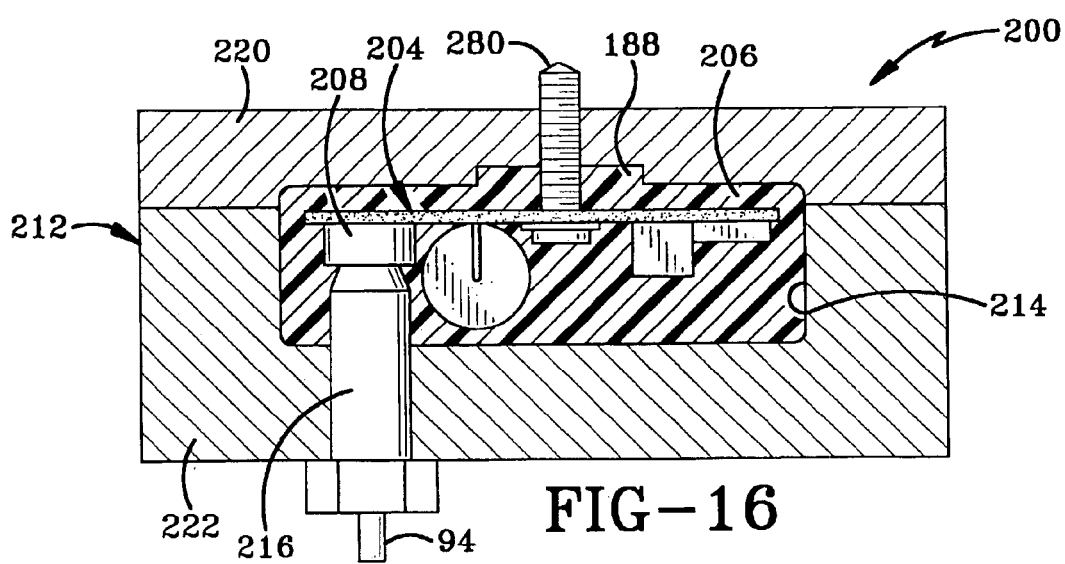
FIG. 16 is a view similar to FIG. 14 with the chamber of the device filled with encapsulation material.

Surfaces 32 and 36 are configured to be spaced from each element of monitoring device 4 when antenna 70 is received in channel 72 formed when halves 20 and 22 are connected. As may be seen in FIGS. 4 and 5, a generous space between each surface of body 12 and monitoring device 4 is provided when monitoring device 4 is held in the floating disposition by the clamping of antenna 70. In accordance with another objective of the present invention, damming element 16 also helps hold the floating disposition of monitoring device 4 by supporting the end of monitoring device 4 opposite antenna 70.

Damming element 16 is adjustably carried by body 12 so that the position of damming element 16 may be quickly and easily adjusted with respect to monitoring device 4 and specifically pressure sensor 8. In the preferred embodiment of the present invention, damming element 16 is threaded and is threadably received in a threaded bore formed in body half 20. The threaded connection between damming element 16 by body half 20 allows the position of damming element 16 to be adjusted with respect to pressure sensor 8 by rotating damming element 16 with respect to body element 20.

Damming element 16 preferably is in the form of a cylinder having an outer surface 80 that snugly fits within bore 78 of first body half 20. First body half 20 includes an outer O-ring seat 82 that seats an outer O-ring 84 in a manner that forces outer O-ring 84 between outer surface 80 and first body half 20. Outer O-ring 84 thus seals encapsulation chamber 14 from bore 78.

In accordance with another objective of the present invention, damming element 16 is used to prevent pressure sensor 8 from becoming clogged with encapsulation material 6 when encapsulation chamber 14 is filled with encapsulation material 6. As such, damming element 16 is configured to engage pressure sensor 8 and surround the inlet 86 of pressure sensor 8 that must remain in fluid communication with the surrounding atmosphere to provide a measurement of the pressure of the surrounding atmosphere. Damming element 16 includes an inner O-ring seat 88 disposed radially inward of outer surface 80 to form a blocking wall 90 between inner O-ring seat and outer wall 80 of damming element 16. An inner O-ring 92 is disposed in inner O-ring seat 88 to form a seal between damming element 16 and pressure sensor 8. Inner O-ring 92 thus seals inlet 86 from encapsulation chamber 14.

Another objective of the present invention involves further sealing inlet 86 from encapsulation chamber 14 by providing a breathing tube 94 that is disposed in a longitudinal passageway 96 in the center of damming element 16. Breathing tube 94 snugly fits over inlet 86 to further seal inlet 86 from encapsulation chamber 14. Inner O-ring 92 is sandwiched between breathing tube 94, pressure sensor 8, and damming element 16 to form a tight seal between breathing tube 94 and encapsulation chamber 14 that prevents encapsulation material 6 from coming into contact with inlet 86. Breathing tube 94 may extend entirely out of longitudinal passageway 96 or may stop short of the end of damming element 16. In other embodiments of the present invention, breathing tube 94 may only have a hollow portion at its tip where it fits over inlet 86 of pressure sensor 8. The remaining portion of breathing tube 94 may be solid.

Encapsulating device 10 is used by first clamping monitoring device 4 between body halves 20 and 22 by clamping antenna 70 in channel 72. Connectors 24 are inserted to hold body halves 20 and 22 together. Breathing tube 94 and damming element 16 may then be inserted into body half 20 and adjusted to contact pressure sensor 8 such that inlet 86 of pressure sensor 8 is sealed from encapsulation chamber 14. Once damming element 16 is properly adjusted and connected to pressure sensor 8, monitoring device 4 is held in a floating disposition within encapsulation chamber 14. Top plate 42 and bottom plate 44 may then be connected to the remaining elements to close the bottom of encapsulation chamber 14 and provide lip 64. After body 12 has been assembled, encapsulation material 6 may be poured into encapsulation chamber 14 through opening 60 in top plate 42. The insertion of encapsulation material 6 is stopped when it reaches the level of lip 64. Encapsulation material 6 is allowed to set up or cure before disassembling body 12 and removing encapsulated monitoring device 2 from encapsulating device 10. Damming element 16 ensures that pressure sensor 8 remains in fluid communication with the surrounding atmosphere once monitoring device 4 has been encapsulated as depicted in FIG. 1.

A first alternative embodiment of a device for encapsulating a monitoring device 104 with an encapsulation material 106 is indicated generally by the numeral 100 in FIGS. 10–13. Encapsulating device 100 is adapted to entirely encapsulate monitoring device 104 while allowing pressure sensor 108 of monitoring device 104 to remain in fluid communication with the atmosphere surrounding encapsulated monitoring device 102. Encapsulating device 100 generally includes an encapsulation body 112 that has an encapsulation chamber 114 disposed in body 112. Encapsulation chamber 114 is configured to receive monitoring device 104 in a floating arrangement such that device 104 is substantially centered in encapsulation chamber 114 when it is received therein. The embodiment of the invention described here and depicted in the drawings is shown for encapsulating a specific embodiment of monitoring device 104 that has an overall rectangular shape. It is understood that the concepts of the present invention may be adapted to function with monitoring devices having different configurations and shapes than monitoring device 104 depicted in these drawings. Encapsulating device 100 also includes a damming element 116 that is carried by encapsulation body 112 where it contacts monitoring device 104 at pressure sensor 108 to support monitoring device 104 within encapsulation chamber 114 and to prevent pressure sensor 108 from becoming clogged when encapsulation chamber 114 is filled with encapsulation material 106. One example of a damming element is described above. Encapsulating device 100 is used by placing monitoring device 104 in encapsulation chamber 114 in a floating or suspended arrangement that allows encapsulation material 106 to surround most of monitoring device 104. Encapsulation material 106 is then poured into or otherwise introduced into encapsulation chamber 114 to surround monitoring device 104. Encapsulation material 106 is then permitted to cure or dry to form encapsulated monitoring device 102 depicted in FIG. 13.

Encapsulation body 112 includes a first body half 120 and a second body half 122 that cooperate to form encapsulation chamber 114 when halves 120 and 122 are connected. Body halves 120 and 122 may be connected by a plurality of connectors such as the bolts depicted with the above-described embodiment of the invention. First 120 or second 122 body half may include a textured surface that forms a portion of encapsulation chamber 114 when body halves 120 and 122 are connected.

Body halves 120 and 122 cooperate to hold monitoring device 104 in a floating disposition within encapsulation chamber 114. The floating disposition allows monitoring device 104 to be entirely surrounded by encapsulation material 106. One of the manners of supporting monitoring device 104 in this floating disposition is to support the antenna 170 of monitoring device 104 in a channel 172 defined by body 112. In the preferred embodiment of the present invention, channel 172 is formed in one or both of the mating surfaces of body halves 120 and 122 so that monitoring device 104 may be placed in encapsulation chamber 114 as body halves 120 and 122 are being put together to clamp antenna 170 between body halves 120 and 122. In the preferred embodiment, channel 172 is partially formed in each body half 120 and 122. Channel 172 includes a wide area 176 adjacent encapsulation chamber 114 that allows encapsulation material 106 to surround a portion of antenna 170 to provide strength to antenna 170 to help prevent it from breaking off.

The inner surfaces of the body halves are configured to be spaced from each element of monitoring device 104 when antenna 170 is received in channel 172 formed when halves 120 and 122 are connected. As may be seen in FIGS. 10 and 12, a generous space between each surface of body 112 and monitoring device 104 is provided when monitoring device 104 is held in the floating disposition by the clamping of antenna 170. Damming element 116 also helps hold the floating disposition of monitoring device 104 by supporting the end of monitoring device 104 opposite antenna 170.

Figure 21:
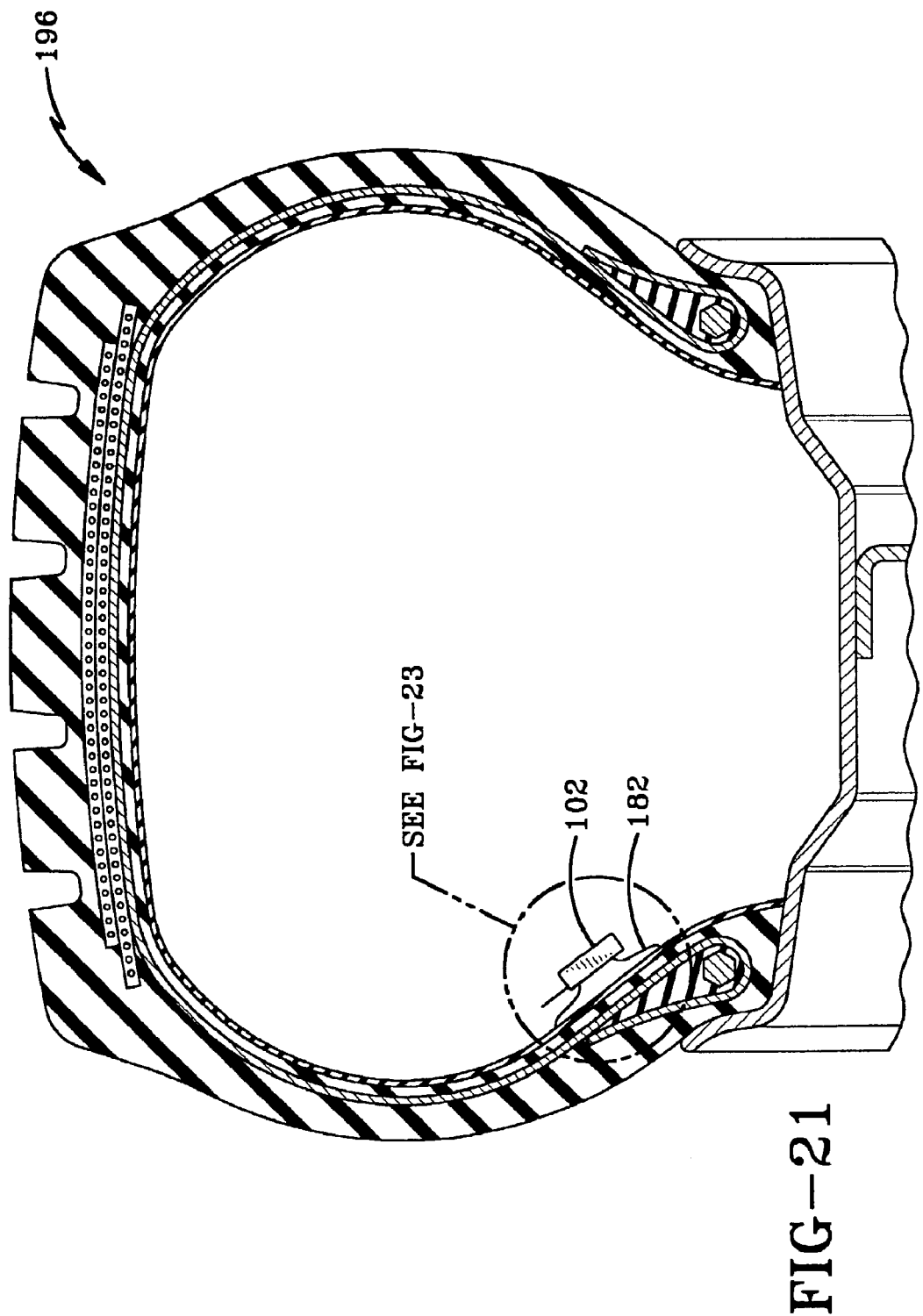
FIG. 21 is a section view of a pneumatic tire with an attachment patch and monitoring device connected to the inner surface of the tire sidewall.
Figure 22:
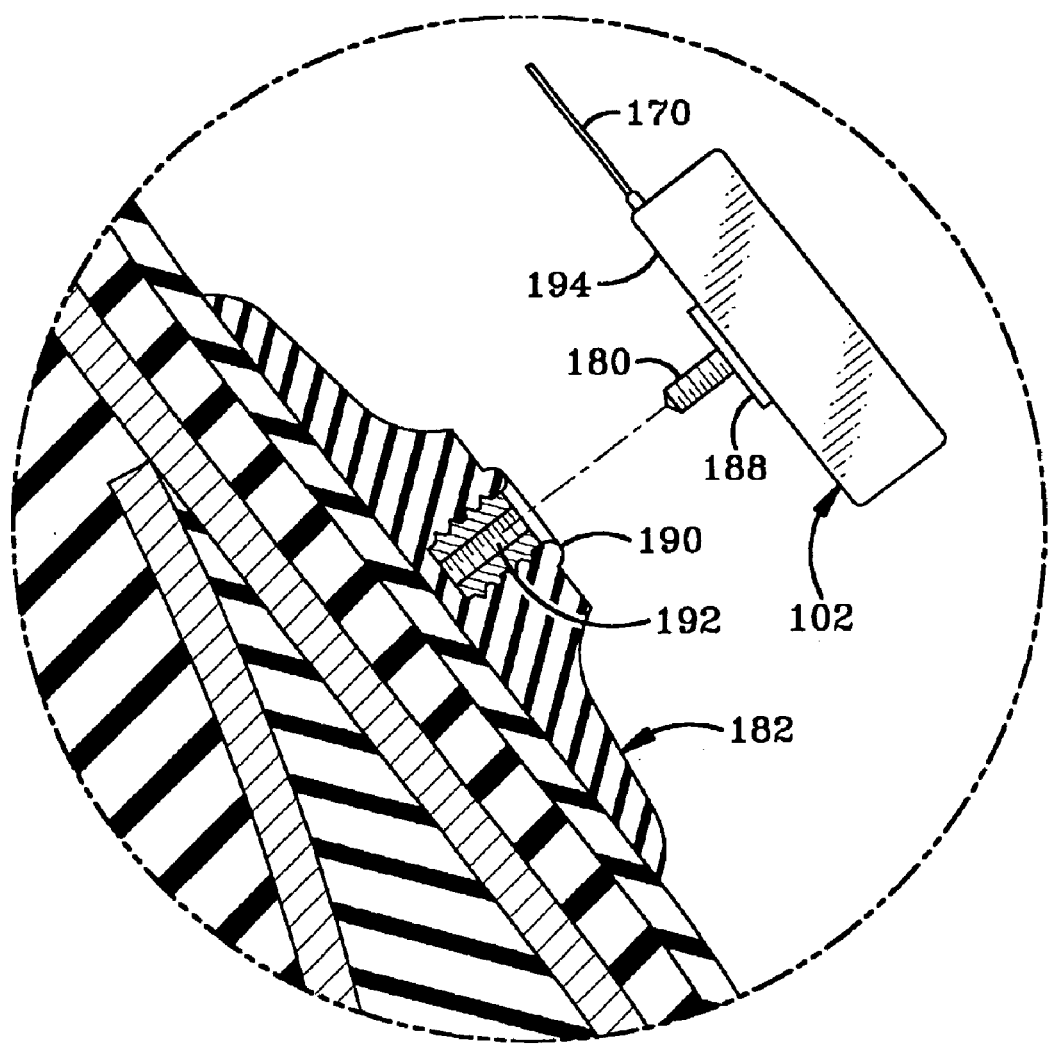
FIG. 22 is an enlarged exploded view of the encircled portion of FIG. 21.
Figure 23:
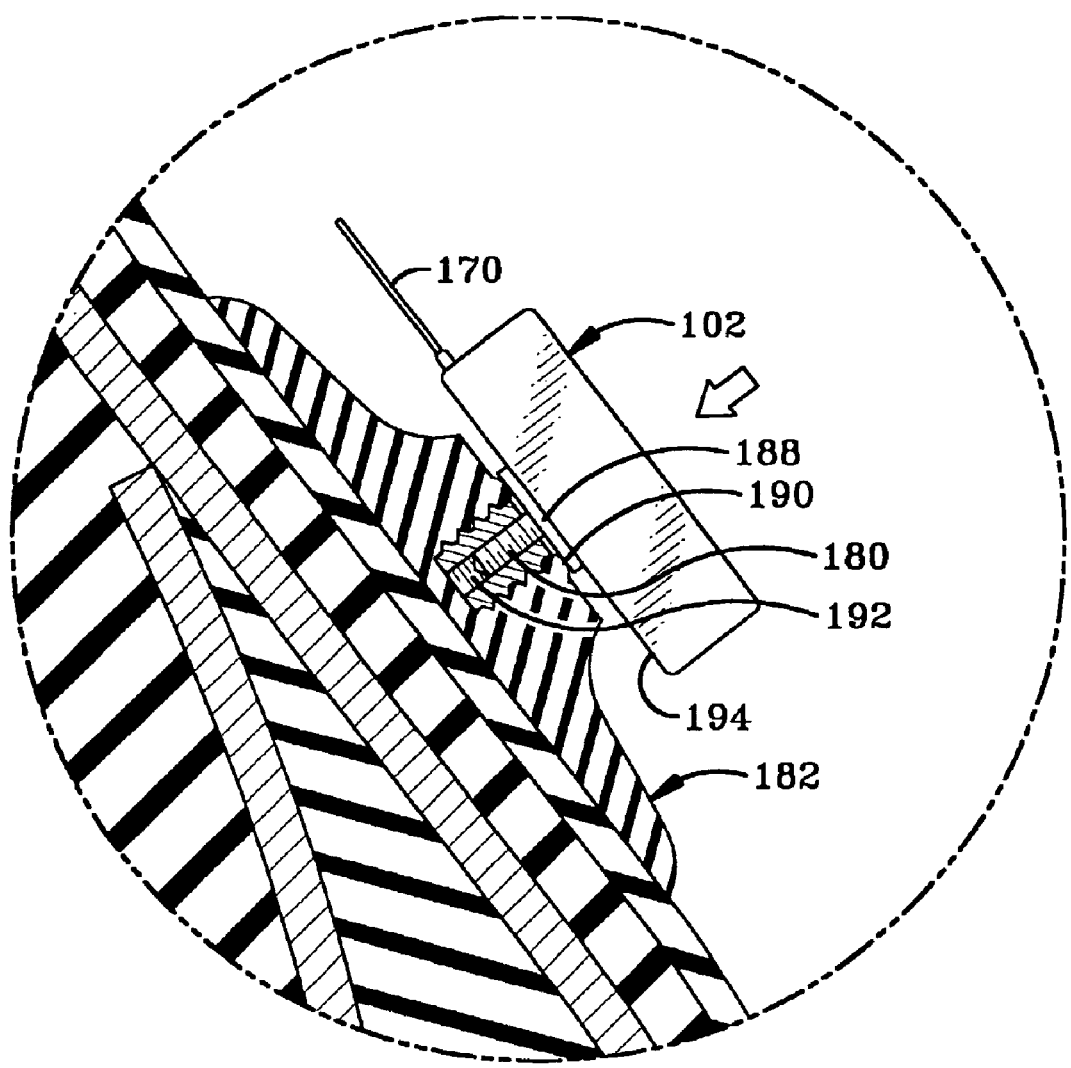
FIG. 23 is an enlarged view of the encircled portion of FIG. 21.

In the first alternative embodiment of the invention, monitoring device 104 includes a threaded rod 180 that is used to mount encapsulated monitoring device 102 to an attachment patch 182 such as the one shown in FIGS. 21—23. Encapsulation device 100 is designed with an opening 184 that allows a portion of threaded rod 180 to extend from encapsulation chamber 114. Body 112 of encapsulation device 100 defines a recess 186 disposed adjacent threaded rod 180. Recess 186 may extend entirely about rod 180 when monitoring device 104 is suspended within encapsulation chamber 114. Recess 186 is configured to form a raised boss 188 at the area where threaded rod 180 extends from the main body of encapsulated monitoring device 102. Boss 188 is used to engage a gasket 190 (FIGS. 22 and 23) that is disposed adjacent a threaded cavity 192 defined by attachment patch 182. As shown in FIGS. 22 and 23, threaded cavity 192 may be defined by an insert that is securely held by the body of patch 182. Gasket 190 is raised with respect to the outer surface of patch 182 so that boss 188, or the outer surface 194 of encapsulated monitoring device 102 engages and compresses gasket 190 as shown in FIG. 23. This compression creates a locking force between the threads of rod 180 and cavity 192. The locking force helps prevent encapsulated monitoring device 102 from vibrating loose when used in a pneumatic tire 196.

A second alternative embodiment of a device for encapsulating a monitoring device 204 with an encapsulation material 206 is indicated generally by the numeral 200 in FIGS. 14–17. Encapsulating device 200 is adapted to entirely encapsulate monitoring device 204 while allowing pressure sensor 208 of monitoring device 204 to remain in fluid communication with the atmosphere surrounding encapsulated monitoring device 202. Encapsulating device 200 generally includes an encapsulation body 212 that has an encapsulation chamber 214 disposed in body 212. Encapsulation chamber 214 is configured to receive monitoring device 204 in a floating or suspended arrangement such that device 204 is substantially centered in encapsulation chamber 214 when it is received therein. The embodiment of the invention described here and depicted in the drawings is shown for encapsulating a specific embodiment of monitoring device 204 that has an overall rectangular shape. It is understood that the concepts of the present invention may be adapted to function with monitoring devices having different configurations and shapes than monitoring device 204 depicted in these drawings. Encapsulating device 200 also includes a damming element 216 that is carried by encapsulation body 212 where it contacts monitoring device 204 at pressure sensor 208 to support monitoring device 204 within encapsulation chamber 214 and to prevent pressure sensor 208 from becoming clogged when encapsulation chamber 214 is filled with encapsulation material 206. Encapsulating device 200 is used by placing monitoring device 204 in encapsulation chamber 214 in a floating arrangement that allows encapsulation material 206 to surround most of monitoring device 204. Encapsulation material 206 is then poured into or otherwise introduced into encapsulation chamber 214 to surround monitoring device 204. Encapsulation material 206 is then permitted to cure or dry to form encapsulated monitoring device 202 depicted in FIG. 17.

Encapsulation body 212 includes a first body half 220 and a second body half 222 that cooperate to form encapsulation chamber 214 when halves 220 and 222 are connected. Body halves 220 and 222 may be connected by a plurality of connectors such as the bolts depicted with the above-described embodiment of the invention. First 220 or second 222 body half may include a textured surface that forms a portion of encapsulation chamber 214 when body halves 220 and 222 are connected.

In the second alternative embodiment of the invention, the antenna of monitoring device 204 is not used to suspend monitoring device 204 within chamber 214. In this embodiment, the threaded rod 280 that extends from chamber 214 is used to position and suspend monitoring device 204. Device 200 cooperates with threaded rod 280 by providing an opening 282 that has a width slightly larger than the outer diameter of threaded rod 280. This configuration allows rod 280 to rest against body 212 to suspend monitoring device 204. The length of opening 282 is somewhat larger than the diameter of rod 280 so that the encapsulation material 206 may be introduced into cavity 214. In this embodiment of the invention, recess 186 is also provided to form boss 188 as described above.

Figure 18:
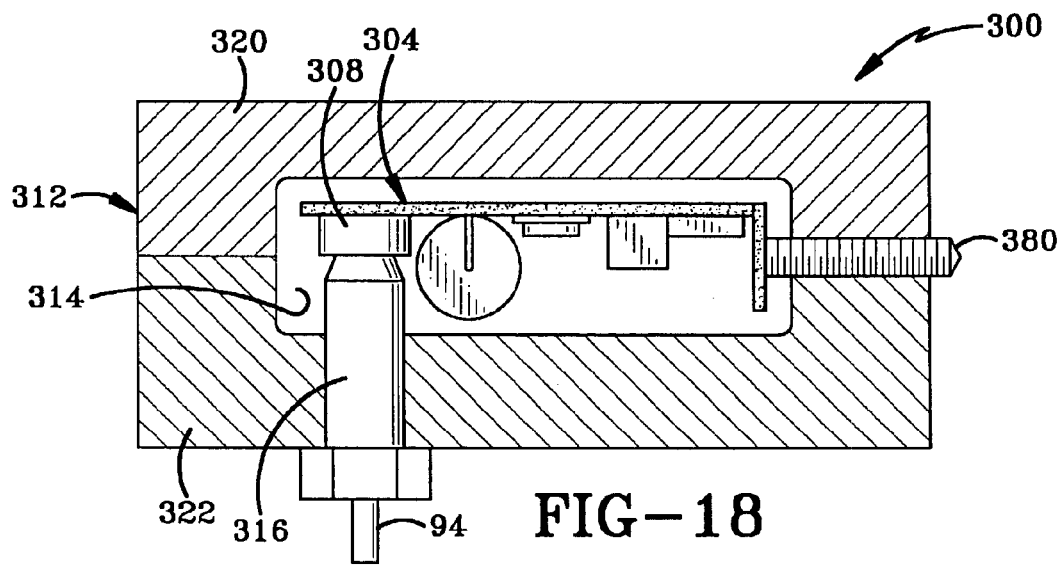
FIG. 18 is a section view similar to FIG. 5 showing a third alternative embodiment of the encapsulation device of the invention.
Figure 19:
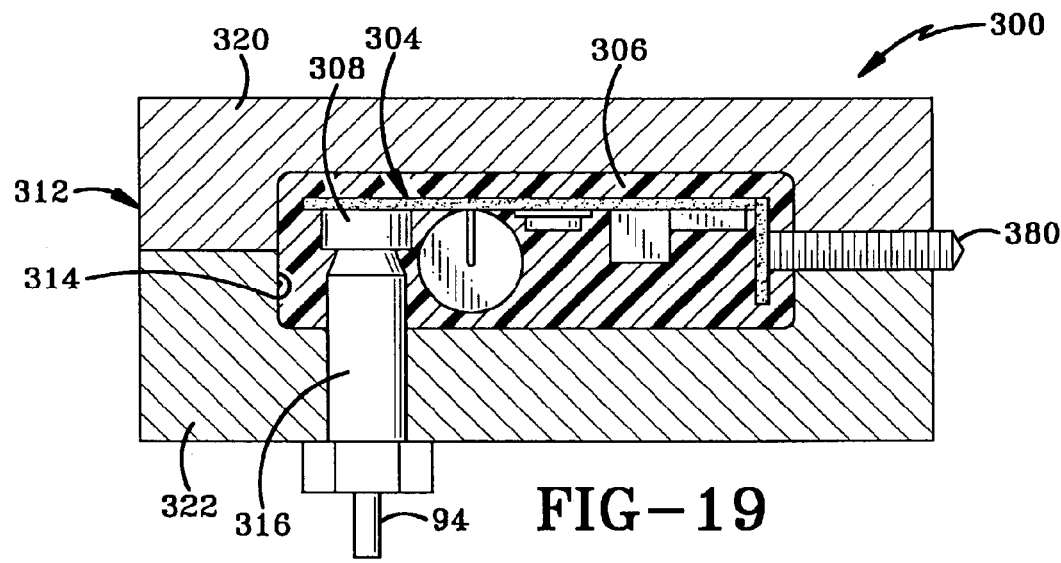
FIG. 19 is a view similar to FIG. 18 with the chamber of the device filled with encapsulation material.
Figure 20:
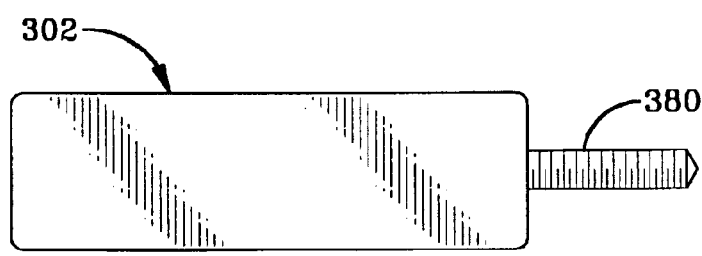
FIG. 20 is a side elevation view of the encapsulated monitoring device made in the third alternative embodiment of the invention.

A third alternative embodiment of a device for encapsulating a monitoring device 304 with an encapsulation material 306 is indicated generally by the numeral 300 in FIGS. 18–20. Encapsulating device 300 is adapted to entirely encapsulate monitoring device 304 while allowing pressure sensor 308 of monitoring device 304 to remain in fluid communication with the atmosphere surrounding encapsulated monitoring device 302. Encapsulating device 300 generally includes an encapsulation body 312 that has an encapsulation chamber 314 disposed in body 312. Encapsulation chamber 314 is configured to receive monitoring device 304 in a floating arrangement such that device 304 is substantially centered in encapsulation chamber 314 when it is received therein. The embodiment of the invention described here and depicted in the drawings is shown for encapsulating a specific embodiment of monitoring device 304 that has an overall rectangular shape. It is understood that the concepts of the present invention may be adapted to function with monitoring devices having different configurations and shapes than monitoring device 304 depicted in these drawings. Encapsulating device 300 also includes a damming element 316 that is carried by encapsulation body 312 where it contacts monitoring device 304 at pressure sensor 308 to support monitoring device 304 within encapsulation chamber 314 and to prevent pressure sensor 308 from becoming clogged when encapsulation chamber 314 is filled with encapsulation material 306. Encapsulating device 300 is used by placing monitoring device 304 in encapsulation chamber 314 in a floating arrangement that allows encapsulation material 306 to surround most of monitoring device 304. Encapsulation material 306 is then poured into or otherwise introduced into encapsulation chamber 314 to surround monitoring device 304. Encapsulation material 306 is then permitted to cure or dry to form encapsulated monitoring device 302 depicted in FIG. 20.

Encapsulation body 312 includes a first body half 320 and a second body half 322 that cooperate to form encapsulation chamber 314 when halves 320 and 322 are connected. Body halves 320 and 322 may be connected by a plurality of connectors such as the bolts depicted with the above-described embodiment of the invention. First 320 or second 322 body half may include a textured surface that forms a portion of encapsulation chamber 314 when body halves 320 and 322 are connected.

The antenna of monitoring device 304 is disposed internal to encapsulated monitoring device 302. A threaded rod 380 extends from encapsulation chamber 314 in a manner similar to those described above. In this embodiment of the invention, rod 380 supports monitoring device 304 in the suspended condition within chamber 314. The third alternative embodiment of the invention may also use boss 188 as described above.

Figure 24:
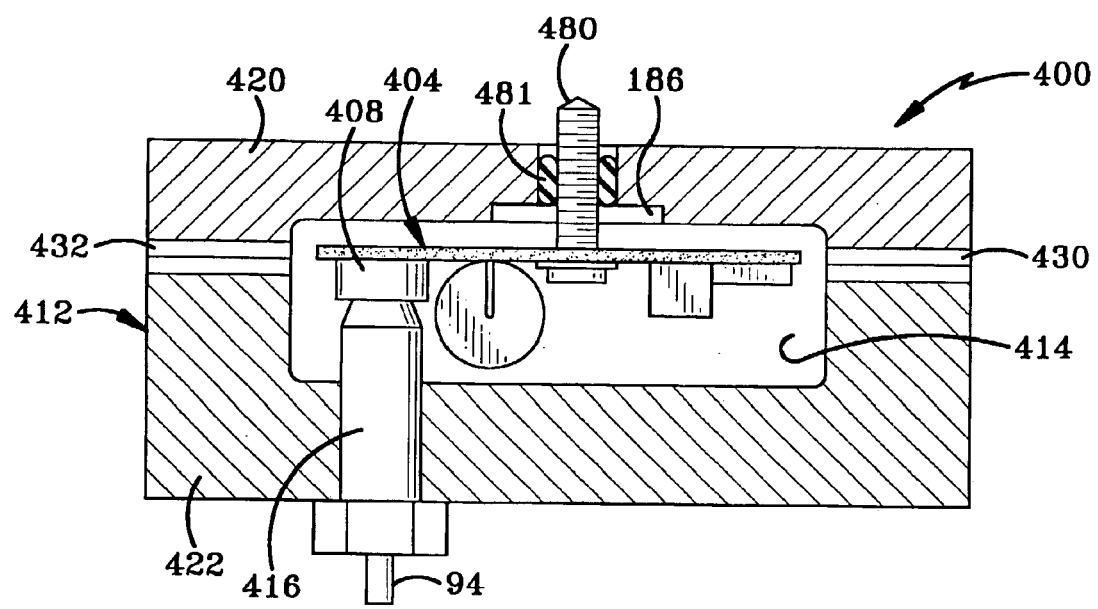
FIG. 24 is a section view similar to FIG. 5 showing a fourth alternative embodiment of the encapsulation device of the invention.
Figure 25:
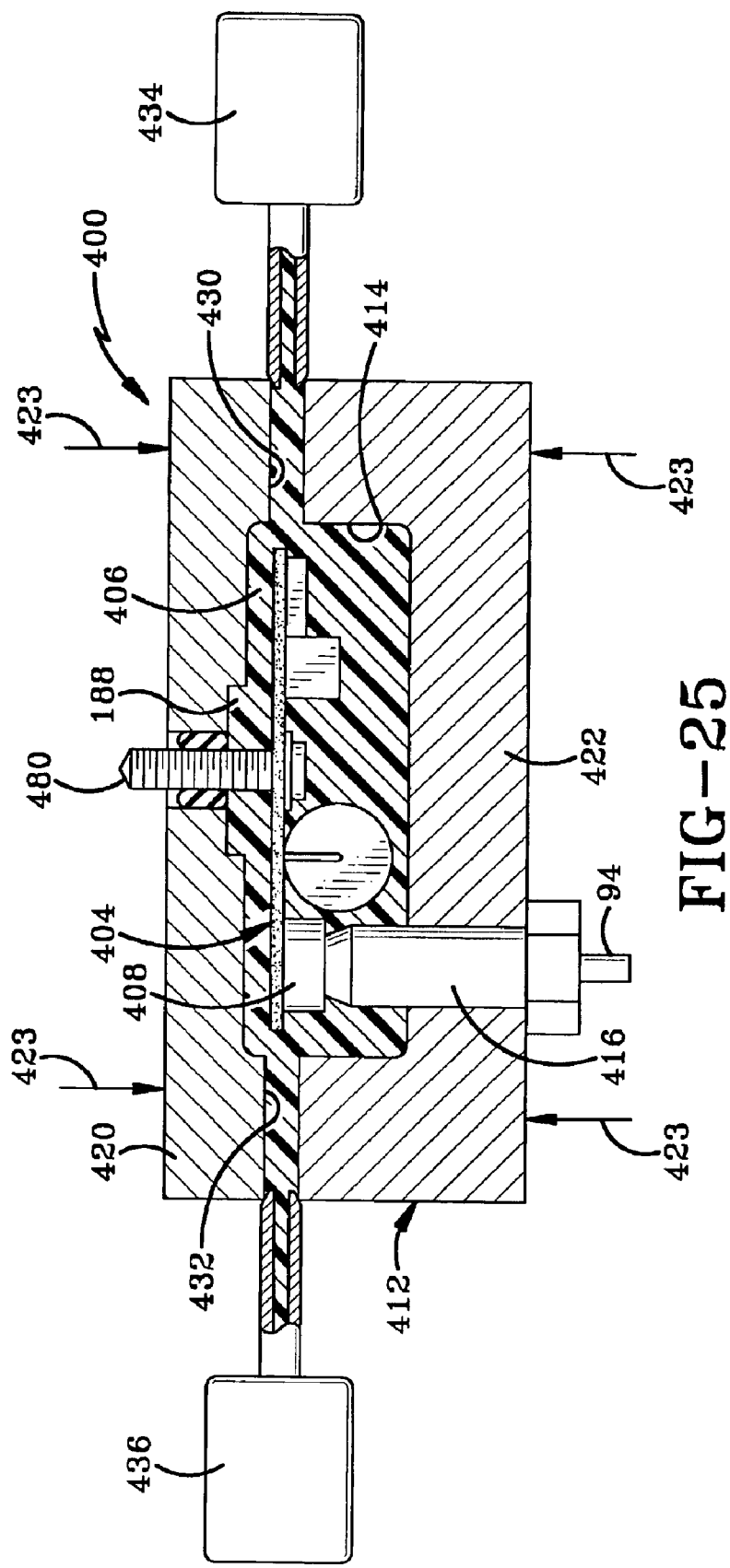
FIG. 25 is a view similar to FIG. 24 showing the encapsulation material being added to the encapsulation device.

A fourth alternative embodiment of a device for encapsulating a monitoring device 404 with an encapsulation material 406 is indicated generally by the numeral 400 in FIGS. 24 and 25. Encapsulating device 400 is adapted to entirely encapsulate monitoring device 404 while allowing pressure sensor 408 of monitoring device 404 to remain in fluid communication with the atmosphere surrounding the encapsulated monitoring device. Encapsulating device 400 generally includes an encapsulating body 412 that has an encapsulation chamber 414 defined by body 412. Encapsulation chamber 414 is configured to receive monitoring device 404 in a floating or suspended arrangement such that device 404 is substantially centered within encapsulation chamber 414 when it is received therein. Encapsulation device 400 further includes a damming element 416 that is carried by encapsulation body 412 where it contacts monitoring device 404 at pressure sensor 408 to support monitoring device 404 within encapsulation chamber 414 to prevent pressure sensor 408 from becoming clogged when encapsulation chamber 414 is filled with encapsulation material 406.

Encapsulation body 412 includes a first body half 420 and a second body half 422 that cooperate to define encapsulation chamber 414 when halves 420 and 422 are connected. Body halves 420 and 422 may be connected by a plurality of connectors such as the bolts depicted with the above-described embodiment of the invention or other suitable mechanisms for applying pressure as shown in FIG. 25 and indicated by the numeral 423. Mechanisms 423 hold halves 420 and 422 together while chamber 414 is being filled with encapsulation material 406.

In the embodiment of monitoring device 404 depicted in FIGS. 24 and 25, the antenna is disposed internal to monitoring device 404. As described above, a threaded rod 480 extends from encapsulation chamber 414 through body 412. A gasket 481 is used to seal chamber 414 around rod 480. Body 412 may also define a recess that is used to form boss 188 as described above. Threaded rod 480 may be used to suspend monitoring device 404 within chamber 414.

Body 412 defines a fill inlet 430 and a vent 432 that are used to introduce encapsulation material 406 into chamber 414 and to vent air from chamber 414 as encapsulation material 406 is introduced into chamber 414. This process is depicted in FIG. 25 wherein a supply of encapsulation material 434 is connected to fill opening 430 and pressurized encapsulation material 406 is introduced into chamber 414. A venting device 436 may optionally be used to draw air from chamber 414 and to pull encapsulation material 406 through the entire volume of chamber 414. Devices 434 and 436 are removed and leave straws of encapsulation material 406 in openings 430 and 432 after encapsulation material 406 is cured. These straws may be removed from the encapsulated monitoring device by known methods.

Figure 26:
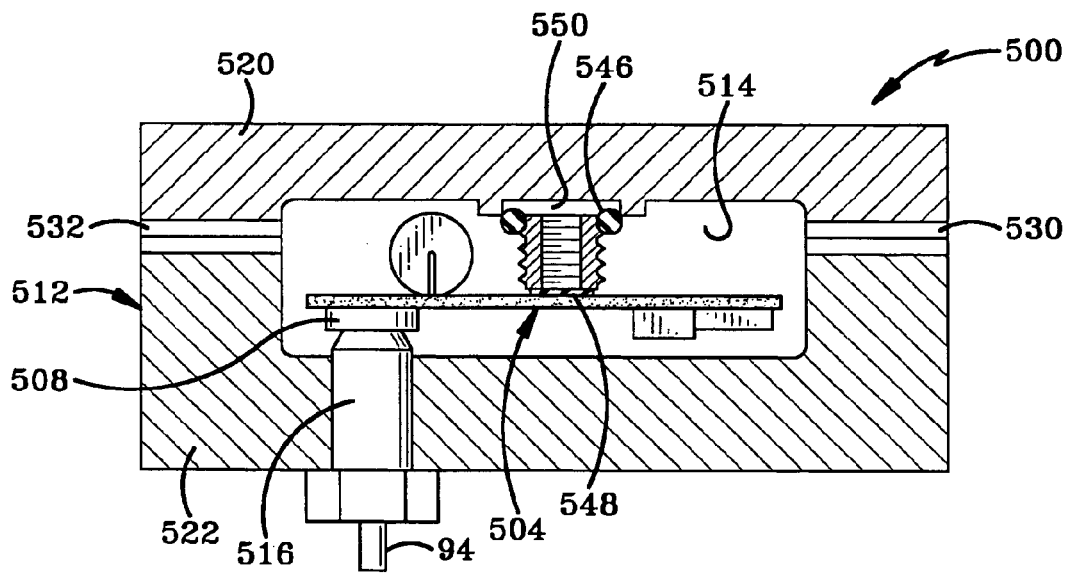
FIG. 26 is a section view similar to FIG. 5 showing a fifth alternative embodiment of the encapsulation device of the invention.
Figure 27:
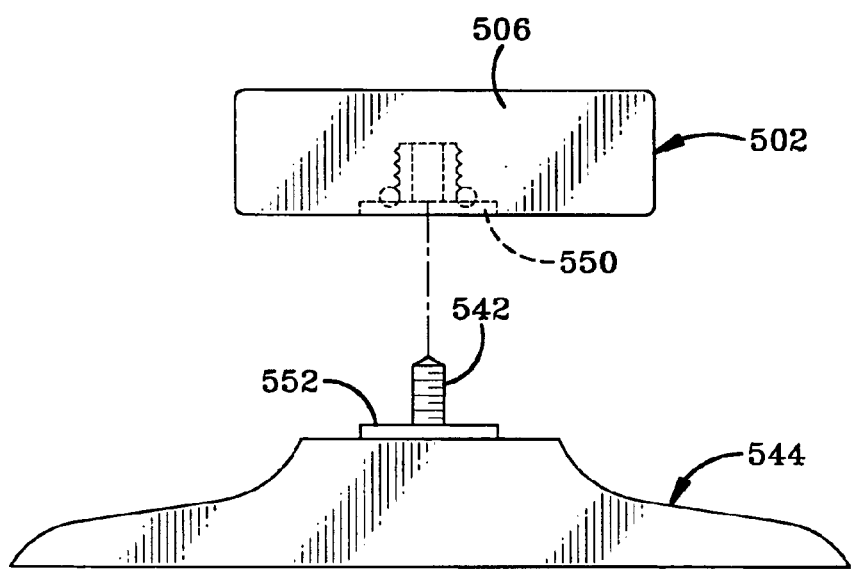
FIG. 27 is an exploded view showing the encapsulated monitoring device made from the encapsulation device of FIG. 26 aligned with a patch having an extended threaded rod for securing the encapsulated monitoring device to the patch.

A fifth alternative embodiment of a device for encapsulating a monitoring device 504 with an encapsulation material 506 is indicated generally by the numeral 500 in FIG. 26. Encapsulating device 500 is adapted to entirely encapsulate monitoring device 504 while allowing the pressure sensor 508 of monitoring device 504 to remain in fluid communication with the atmosphere surrounding the encapsulated monitoring device 502. Encapsulating device 500 generally includes an encapsulation body 512 that defines an encapsulation chamber 514. Encapsulation chamber 514 is configured to receive monitoring device 504 in a suspended or floating arrangement. Encapsulating device 500 also includes a damming element 516 that prevents pressure sensor 508 from becoming clogged.

Encapsulation body 512 includes a first body half 520 and a second body half 522 that cooperate to form encapsulation chamber 514 when halves 520 and 522 are connected. As described above, body 512 may also define a fill opening 530 and a vent opening 532 that are used to fill chamber 514 with encapsulation material 506.

In the fifth alternative embodiment of the invention, encapsulated monitoring device 502 includes a threaded sleeve 540 that is adapted to engage a threaded post 542 that extends from an attachment patch 544. Threaded sleeve 540 is shown in FIG. 26 as being attached to body half 520 with a gasket 546. An appropriate connector 548 may secure sleeve 540 to monitoring device 504. In this situation, threaded sleeve 540 helps suspend monitoring device 504 within chamber 514. In another embodiment, threaded sleeve 540 is spaced from monitoring device 504 and encapsulation material 506 holds sleeve 540 to monitoring device 504 after encapsulation material 506 cures. Body half 520 may be configured to define a recess 550 disposed about the opening to threaded sleeve 540. Recess 550 is adapted to cooperate with a boss 552 that projects from patch 544 about threaded post 542. Boss 542 and recess 550 are adapted to form a locking arrangement when encapsulated monitoring device 502 is threaded onto patch 544 as described above.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A method for encapsulating a monitoring device for a pneumatic tire wherein the monitoring device includes a threaded rod and a pressure sensor; the method comprising the steps of:
    positioning the monitoring device in an encapsulation chamber of an encapsulation device with a portion of the threaded rod extending from the encapsulation chamber;
    positioning a damming element over the pressure sensor to prevent the pressure sensor from clogging; and
    filling the encapsulation chamber with encapsulation material to encapsulate the monitoring device to form an encapsulated monitoring device.

2. The method of claim 1, further comprising the step of supporting the monitoring device within the encapsulation chamber with the threaded rod.

3. The method of claim 2, further comprising the step of supporting the monitoring device within the encapsulation chamber with the damming element.

4. The method of claim 2, further comprising the step of supporting the monitoring device within the encapsulation chamber with an antenna extending from the monitoring device.

5. The method of claim 1, further comprising the step of adding the encapsulation material to the encapsulation chamber through an opening that allows a portion of the threaded rod to extend from the encapsulation chamber.

6. The method of claim 1, further comprising the step of forming a raised boss around the portion of the threaded rod that extends from the encapsulation chamber.

7. The method of claim 6, further comprising the steps of:
    providing an attachment patch having a threaded cavity with an opening and a gasket adjacent the opening; and
    threading the threaded rod of the encapsulated monitoring device into the threaded cavity until the raised boss of the encapsulated monitoring device engages the gasket.

8. The method of claim 7, further comprising the step of compressing the gasket to create a locking force against the raised boss.

9. The method of claim 1, further comprising the steps of:
    providing an attachment patch having a threaded cavity with an opening and a gasket adjacent the opening; and
    threading the threaded rod of the encapsulated monitoring device into the threaded cavity until the encapsulated monitoring device engages the gasket.

10. The method of claim 9, further comprising the step of compressing the gasket to create a locking force against the encapsulated monitoring device.

11. The method of claim 1, further comprising the step of threading the damming element to the encapsulation device.

12. A method for encapsulating a monitoring device for a pneumatic tire wherein the monitoring device includes a threaded rod and a pressure sensor; the method comprising the steps of:

positioning the monitoring device in an encapsulation chamber of an encapsulation device with a portion of the threaded rod extending from the encapsulation chamber;

engaging the threaded rod against the encapsulation device to suspend the electronic monitoring device within the encapsulation chamber; and filling the encapsulation chamber with encapsulation material to encapsulate the monitoring device to form an encapsulated monitoring device.

13. The method of claim 12, further comprising the step of damming the pressure sensor to prevent the pressure sensor from clogging with encapsulation material.

14. The method of claim 12, further comprising the step of supporting the monitoring device within the encapsulation chamber with an antenna extending from the monitoring device.

15. The method of claim 12, further comprising the step of adding the encapsulation material to the encapsulation chamber through an opening that allows a portion of the threaded rod to extend from the encapsulation chamber.

16. The method of claim 12, further comprising the step of forming a raised boss around the portion of the threaded rod that extends from the encapsulation chamber.

17. The method of claim 16, further comprising the steps of:

providing an attachment patch having a threaded cavity with a gasket adjacent the cavity; and threading the threaded rod of the encapsulated monitoring device into the threaded cavity until the raised boss of the encapsulated monitoring device engages the gasket.

18. The method of claim 17, further comprising the step of compressing the gasket to create a locking force against the raised boss.

19. The method of claim 12, further comprising the steps of:

providing an attachment patch having a threaded cavity with a gasket adjacent the cavity; and threading the threaded rod of the encapsulated monitoring device into the threaded cavity until the encapsulated monitoring device engages the gasket.

20. The method of claim 19, further comprising the step of compressing the gasket to create a locking force against the encapsulated monitoring device.

21. In combination, an encapsulation device for encapsulating a monitoring device and a monitoring device; the combination comprising:

an encapsulation device defining an encapsulation chamber;

a monitoring device having a threaded rod and a pressure sensor; and the monitoring device being suspended in the encapsulation chamber through the engagement of the threaded rod with the encapsulation device.

22. The combination of claim 21, wherein at least a portion of the threaded rod is disposed outside the encapsulation chamber.

23. The combination of claim 21, further comprising a damming element; the damming element disposed adjacent the pressure sensor to prevent the pressure sensor from being clogged with encapsulation material.

24. The combination of claim 23, further comprising an outer O-ring disposed between said damming element and said encapsulation device.

25. The combination of claim 23, further comprising an inner O-ring seat formed in said damming element, an inner O-ring disposed in said seat, said inner O-ring adapted to engage the pressure sensor on the monitoring device when the monitoring device is disposed in said encapsulation chamber.

26. The combination of claim 25, wherein said damming element is a tube having a longitudinal passageway.

27. The combination of claim 26, further comprising a breathing tube disposed in said longitudinal passageway, said breathing tube adapted to engage the pressure sensor when the monitoring device is disposed in said encapsulation chamber.

28. The combination of claim 27, wherein the inner O-ring is disposed between the breathing tube and the damming element.

29. The combination of claim 21, further comprising a recess defined by the encapsulation device; the recess being disposed adjacent the threaded rod and adapted to form a raised boss.

30. In combination, an encapsulation device for encapsulating a monitoring device and a monitoring device; the combination comprising:

an encapsulation device defining an encapsulation chamber;

a monitoring device having a threaded sleeve and a pressure sensor; and the monitoring device being suspended in the encapsulation chamber through the engagement of the threaded sleeve with the encapsulation device.

31. The combination of claim 30, wherein the entire threaded sleeve is disposed inside the encapsulation chamber.

32. The combination of claim 30, further comprising a gasket disposed intermediate the threaded sleeve and the encapsulation device.

33. The combination of claim 30, further comprising a damming element; the damming element being disposed adjacent the pressure sensor to prevent the pressure sensor from being clogged with encapsulation material.

34. The combination of claim 33, further comprising an outer O-ring disposed between said damming element and said encapsulation device.

35. The combination of claim 33, further comprising an inner O-ring seat formed in said damming element, an inner O-ring disposed in said seat, said inner O-ring adapted to engage the pressure sensor on the monitoring device when the monitoring device is disposed in said encapsulation chamber.

36. The combination of claim 35, wherein said damming element is a tube having a longitudinal passageway.

37. The combination of claim 36, further comprising a breathing tube disposed in said longitudinal passageway, said breathing tube adapted to engage the pressure sensor when the monitoring device is disposed in said encapsulation chamber.

38. The combination of claim 37, wherein the inner O-ring is disposed between the breathing tube and the damming element.

39. The combination of claim 30, further comprising a recess defined by the encapsulation device; the recess being disposed adjacent the threaded sleeve and adapted to form a raised boss.

* * * * *